(12) United States Patent
Tani

(10) Patent No.: US 9,189,497 B2
(45) Date of Patent: Nov. 17, 2015

(54) INFORMATION PROCESSING APPARATUS, CONTROL METHOD THEREFOR, AND PROGRAM FOR CLASSIFYING A PLURALITY OF DATA

(71) Applicant: CANON KABUSHIKI KAISHA, Tokyo (JP)

(72) Inventor: Kazuteru Tani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 13/903,711

(22) Filed: May 28, 2013

(65) Prior Publication Data

US 2013/0325868 A1 Dec. 5, 2013

(30) Foreign Application Priority Data

May 30, 2012 (JP) .................. 2012-123559

(51) Int. Cl.
*G06F 7/00* (2006.01)
*G06F 17/30* (2006.01)
(52) U.S. Cl.
CPC .... *G06F 17/30247* (2013.01); *G06F 17/30274* (2013.01)

(58) Field of Classification Search
CPC .......... G06F 17/3053; G06F 17/30864; G06F 17/30038; G06F 17/30867; G06F 17/30011
USPC .......................................... 707/749
See application file for complete search history.

(56) References Cited

U.S. PATENT DOCUMENTS 6,700,889 B1 * 3/2004 Nun ............................ 370/392
7,180,551 B2 2/2007 Katayama

* cited by examiner

*Primary Examiner* — Truong Vo
(74) *Attorney, Agent, or Firm* — Canon USA, Inc., IP Division

(57) ABSTRACT

An information processing apparatus classifies a piece of content data as a first or second category in response to a user operation while outputting the content data for a predetermined time. When the user operation is not performed from the start of the output of the content data to the termination, the information processing apparatus automatically classifies the content data as a third category. When there is a shortage of the number of pieces of content data classified as the first or second category, the information processing apparatus adds a piece of content data classified as the third category.

7 Claims, 8 Drawing Sheets

INFORMATION PROCESSING APPARATUS, CONTROL METHOD THEREFOR, AND PROGRAM FOR CLASSIFYING A PLURALITY OF DATA

BACKGROUND OF THE INVENTION

1. Field of the Invention

The present invention relates to a technique of classifying a plurality of data.

2. Description of the Related Art

In the past, an image processing apparatus has performed a SLIDE SHOW playback of image files in order for the user to sequentially see a plurality of images and designate the image that the user wants to print.

The user sees the SLIDE SHOW and operates the apparatus to classify the images while the image processing apparatus performs a SLIDE SHOW playback of the images. When the display time elapses while the user wavers over as which category to classify the image, the next image is displayed as the image has not been classified. Thus, an unclassified image remains. To classify all the images, the image processing apparatus needs to perform the SLIDE SHOW playback again and the user has to repeatedly see the SLIDE SHOW to classify the images. This takes time and effort.

SUMMARY OF THE INVENTION

In light of the foregoing, an objective of the present invention is to classify content data in a shorter time without taking user's time and effort so much.

Further features of the present invention will become apparent from the following description of exemplary embodiments (with reference to the attached drawings).

DESCRIPTION OF THE EMBODIMENTS

Hereinafter, preferred embodiments of the present invention will be described as examples in detail with reference to the drawings. However, the constituent elements described in the embodiments are merely examples and the scope of the present invention is not limited to the examples.

First Embodiment

Figure 1:
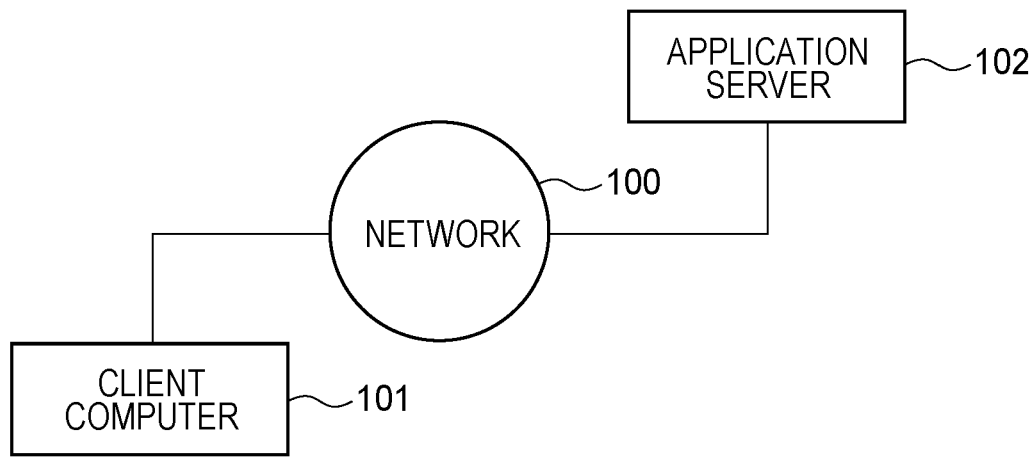
FIG. 1 is a block diagram illustrating an exemplary configuration of the whole system according to an embodiment of the present invention.

First, the whole of a system according to the present embodiment will be described with reference to FIG. 1. As illustrated in FIG. 1, a client computer 101 is connected to an application server 102 through a network 100 such as the Internet.

Next, an information processing apparatus (computer apparatus) that implements each of the client computer 101 and the application server 102 will be described with reference to FIG. 2. Each of the client computer 101 and the application server 102 can be implemented by a single information processing apparatus, or can be implemented by distributing the functions of each of the client computer 101 and the application server 102 into a plurality of information processing apparatuses as necessary. When a plurality of information processing apparatuses is included, the apparatuses are connected to each other through a local area network (LAN) or the like to be capable of communicating with each other. Concretely, the client computer 101 is implemented with devices such as a personal computer, a tablet terminal, a smartphone, or a digital camera.

Figure 2:
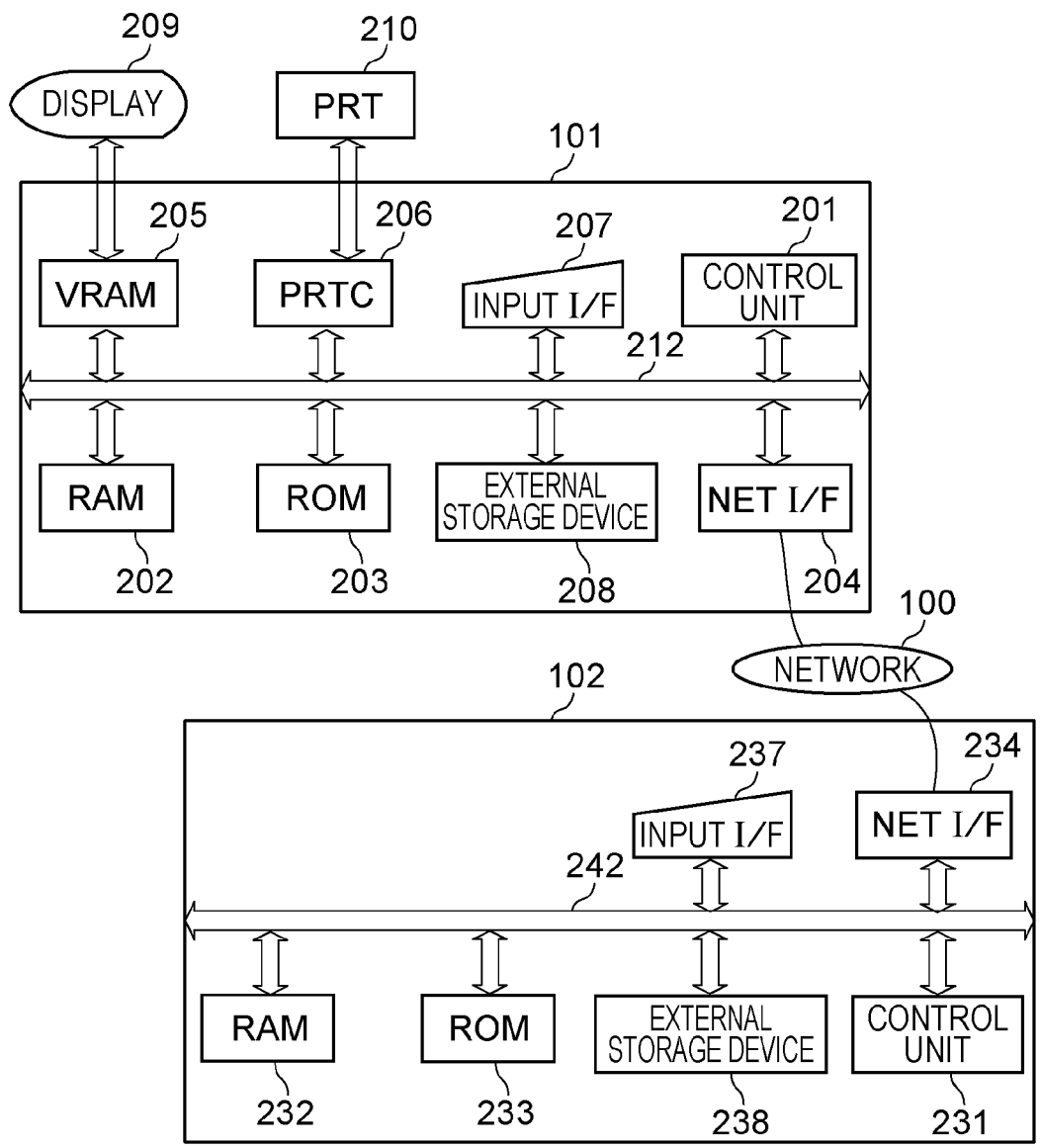
FIG. 2 is a block diagram illustrating an exemplary configuration of an application server and a client computer according to an embodiment of the present invention.

Referring to FIG. 2, control units 201 and 231 control the whole client computer 101 and the whole application server 102, respectively. For example, each of the control units 201 and 231 is a central processing unit (CPU). Each of read only memories (ROM) 203 and 233 stores a program or a parameter that does not need to be changed. Each of random access memories (RAM) 202 and 232 temporarily stores a program or data supplied from an external device or the like. Each of external storage devices 208 and 238 is a hard disk, a memory card, or the like that is fixedly installed at each of the client computer 101 and the application server 102. Each of the external storage devices 208 and 238 stores a program such as an operating system (OS). Input interfaces 207 and 237 are connected to input devices such as a pointing device or a keyboard for inputting data according to the user operation. A printer controller (PRTC) 206 controls an output signal to a printer 210. A video RAM (VRAM) 205 draws an image to be displayed on a display 209. The image generated in the VRAM 205 is transmitted to the display 209 according to a predetermined regulation and this causes the display 209 to display the image. Network interfaces 204 and 234 are connected to the network 100. Note that the data transfer between the memories (for example, between the VRAM 205 and another memory), or between the memory and each of the I/O devices (for example, the network interfaces 204 and 234) is controlled by a Bit Move Unit (not illustrated in the drawings). System buses 212 and 242 connect the above-mentioned units such that the units can communicate with each other.

Note that the external storage device 208 stores a Web browser program (hereinafter, referred to as a browser), or content data such as an image file or a music file of the present embodiment.

Further, the external storage device 238 stores SLIDE SHOW control application program software (hereinafter, referred to as a SLIDE SHOW control application) of the present embodiment, or content data such as an image file or a music file.

Figure 3:
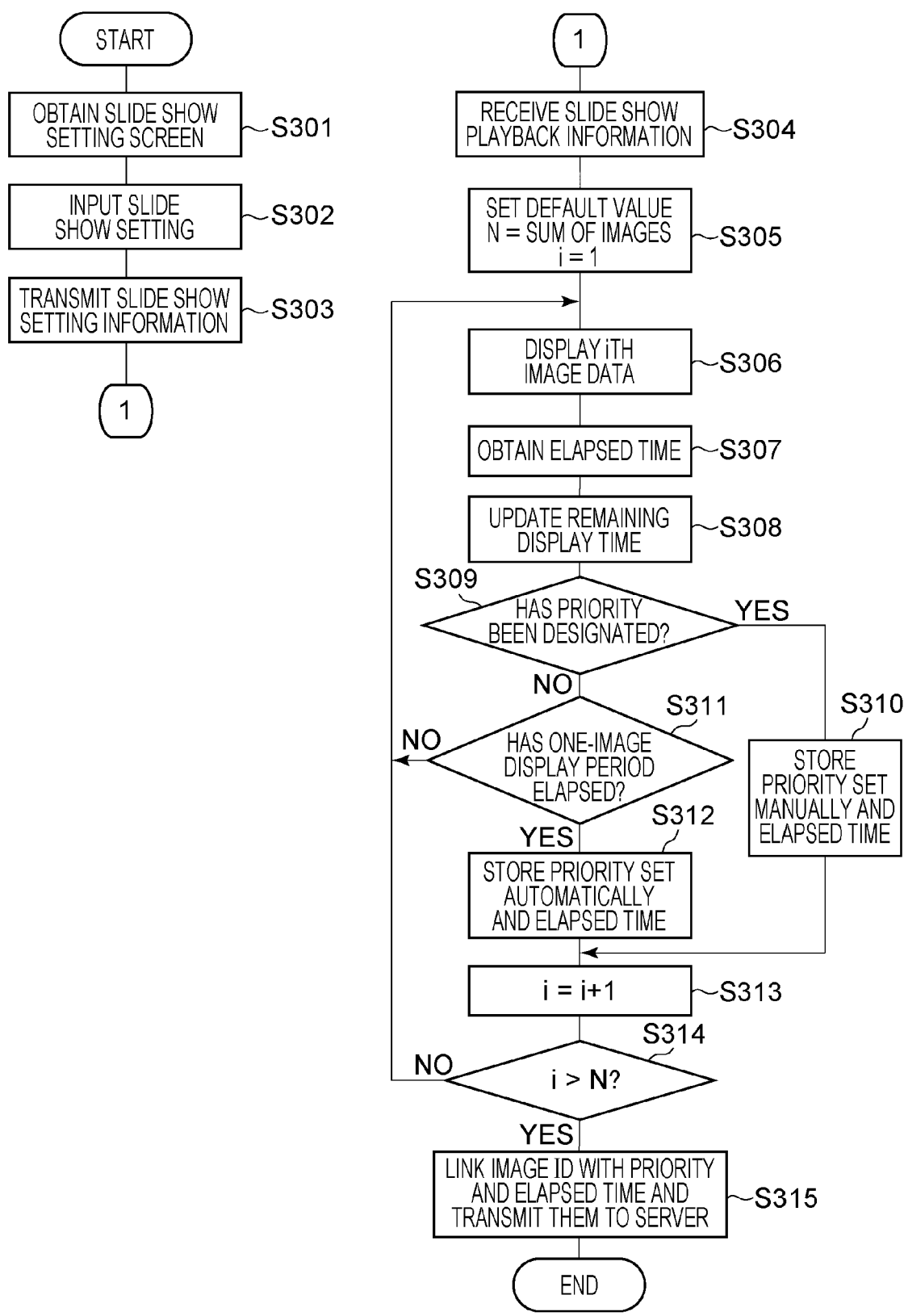
FIG. 3 is a flowchart illustrating an exemplary process performed by a client computer according to an embodiment of the present invention.

A process to be implemented in the client computer 101 will be described with reference to FIG. 3. Note that the process to be described below is implemented by controlling each of the units according to the OS or the browser that has been read from the external storage device 208 by the control unit 201 in the client computer 101.

First, the control unit 201 activates the browser in response to the user operation in order to establish the communication with the application server 102 according to a predetermined URL. Then, the control unit 201 receives display control information on a SLIDE SHOW setting screen from the application server 102 and displays the SLIDE SHOW setting screen on the display 209 (S301). The control unit 201 inputs each of the data about the SLIDE SHOW setting (SLIDE SHOW setting information) based on the SLIDE SHOW setting screen and in response to the user operation (S302).

Figure 4:
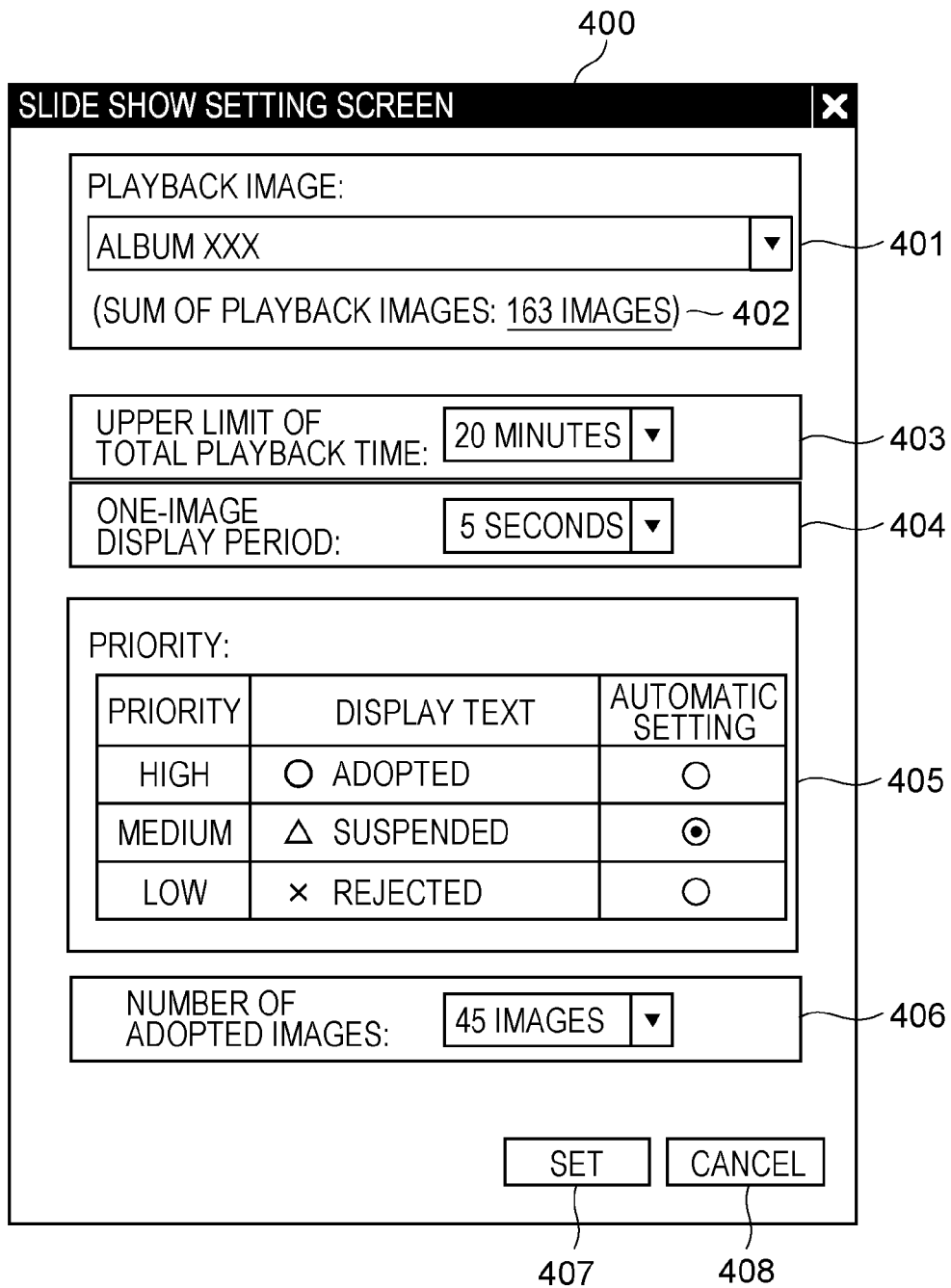
FIG. 4 is a view illustrating an example of a SLIDE SHOW setting screen according to an embodiment of the present invention.

Here, the SLIDE SHOW setting screen will be described with reference to FIG. 4. An album including images to be played back as a SLIDE SHOW is set at a playback image field 401 on a SLIDE SHOW setting screen 400. The sum of the playback images 402 included in the set album is also displayed. Further, an upper limit of the time to perform a SLIDE SHOW playback is set at a total playback time upper limit field 403. A display period per image is set at a one-image display period field 404. Note that a value that can be set at the one-image display period field 404 is smaller than a value obtained by dividing a value set at the total playback time upper limit field 403 by the sum of the playback images 402. As described above, setting the upper limit on the total playback time required to perform a SLIDE SHOW can prevent the SLIDE SHOW playback from being prolonged. A value of the priority level is set at a priority level automatic setting field 405. The value is automatically given to an image when the designation of the priority level is not performed by the user operation by the termination of the display of the image. This automatically gives a priority level to an image even when the user has not been able to set a priority level to the image while the image is displayed. Thus, a priority level can surely be given to every image file at the termination of the SLIDE SHOW playback. The number of images to which the user wants to give the priority level "high" is set at an adopted image numbers field 406. Note that a given number can be input to the adopted image numbers field 406 by the user. Further, for example, the user selects a desired template so that a predetermined number corresponding to the template can automatically be input to the adopted image numbers field 406. Note that a value that can be set at the adopted image numbers field 406 is smaller than the sum of the playback images. Upon detecting that a cancel button 408 has been pressed down by the user operation, the control unit 201 discards the set value and terminates the present process.

Upon detecting that a setting button 407 has been pressed down by the user operation, the control unit 201 transmits the SLIDE SHOW setting information that has been input to each of the fields to the application server 102 (S303). At that time, the application server transmits the SLIDE SHOW playback information to the client computer 101. The SLIDE SHOW playback information includes each of the data required to play back the SLIDE SHOW of the image files. The data includes the image files included in the album, the one-image display period, the display control information of the SLIDE SHOW playback screen and the like that have been set as the SLIDE SHOW setting information. Note that the image files that are transmitted at that time include high-resolution original image data and thumbnail image data generated by the process for reducing the original image data. Alternatively, however, only the thumbnail image data can be included, or only the original image data can be included.

The control unit 201 receives the SLIDE SHOW playback information from the application server 102 (S304). Then, the control unit 201 substitutes the sum of the playback images that have been obtained from the SLIDE SHOW playback information into a variable "N" and substitutes "1" into a counter i as a default value (S305). The control unit 201 obtains the ith image file from the SLIDE SHOW playback information to display the image file on a SLIDE SHOW playback screen (S306).

Figure 5:
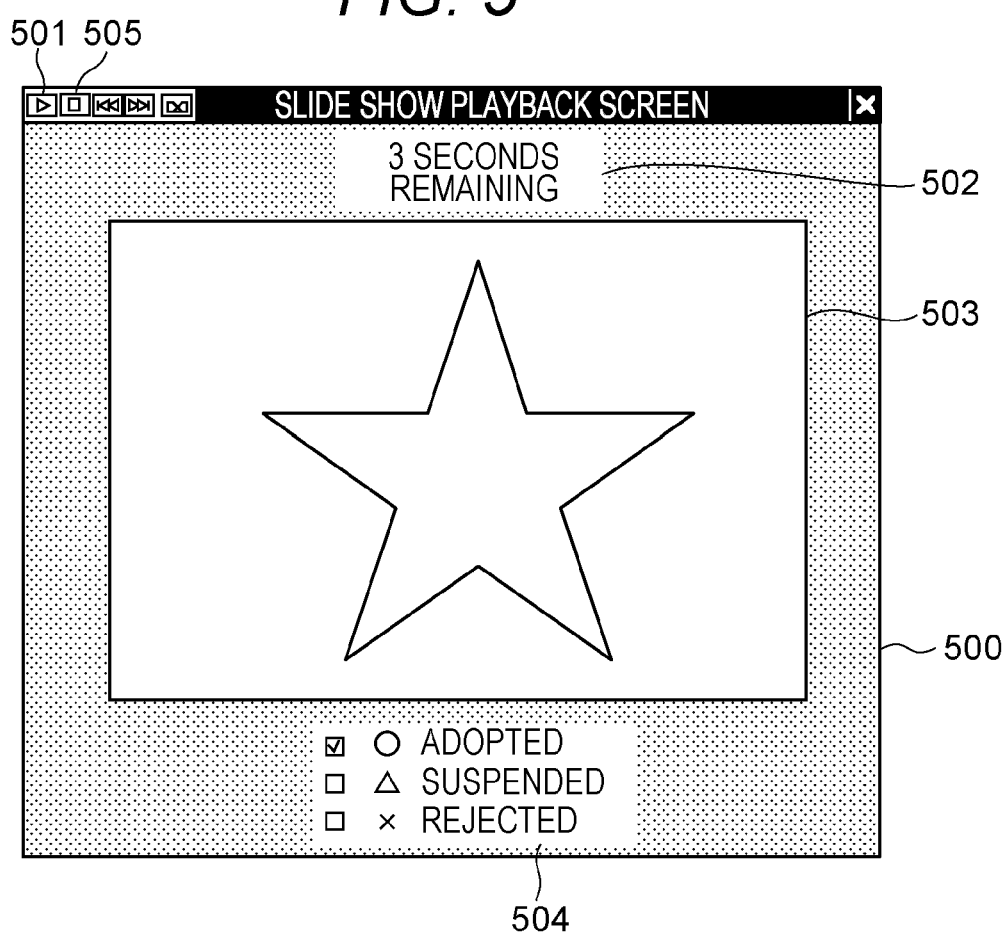
FIG. 5 is a view illustrating an example of a SLIDE SHOW playback screen according to an embodiment of the present invention.

Here, the SLIDE SHOW playback screen will be described with reference to FIG. 5. A playback button 501 for instructing the start of a SLIDE SHOW playback and a stop button 505 for instructing the stop are shown on a SLIDE SHOW playback screen 500. Further, an image 503 for showing the ith image file and a remaining time 502 before the termination of the display of the image 503 are displayed. Further, a priority level designation field 504 for designating the priority level of the currently displayed image 503 is displayed. Priority levels that are three stages of "adopted", "suspended", and "rejected" are displayed at the priority level designation field 504 illustrated in FIG. 5 so that the user designates one of them. The priority levels correspond to three flags of "high", "moderate", and "low", respectively. Note that the default value of the priority level of an image is null.

The control unit 201 detects the elapsed time from the start of the display of the ith image file (S307), calculates the remaining display time from the difference between the one-image display period and the elapsed time to update and display the remaining display time on the SLIDE SHOW playback screen 500 (S308). Further, the control unit 201 determines whether a priority level has been designated to the currently displayed image file by the user operation (S309).

When a priority level has been designated (Yes in S309), the control unit 201 links an image identifier of the currently displayed ith image file with the designated priority level and the elapsed time and stores them in the RAM 202 (S310). Then, the process goes to step S313. Note that the image identifier is data for uniquely specifying the ith image file. Further, the elapsed time is the time elapsed from the start of the display of the ith image file until a priority level has been designated. If a priority level is set for the image file at that time, the process immediately goes to the procedure for displaying the next image file before the one-image display period elapses. This can shorten the time required for the user operation.

On the other hand, when the priority level has not been designated (No in S309), the control unit 201 determines whether the elapsed time from the start of the display of the ith image file exceeds the one-image display period (S311). When the display time of the ith image file does not exceed the one-image display period (No in S311), the control unit 201 returns to step S306 to continue the display of the ith image file. On the other hand, when the display time of the ith image file exceeds the one-image display period (Yes in S311), the control unit 201 links the image identifier of the ith image file with the value indicating the priority level and set at the priority level automatic setting field 405 and the one-image display period and then stores them in the RAM 202 (S312). At that time, the one-image display period is stored as the elapsed time from the start of the display of the ith image file until the priority level is designated.

The control unit 201 adds one to the counter i (S313). When the counter i is larger than the variable N (Yes in S314), the control unit 201 links the image identifier stored in the RAM 202 with the priority level and the elapsed time and then transmits them to the application server 102 (S315). When the counter i is smaller than the variable N at that time (No in S314), the control unit 201 returns to step S306 to display a new ith image file. Note that the control unit 201 can delete the data stored in the RAM 202 after the transmission to the application server 102 in step S315. This secures the memory capacity of the RAM 202 so that the priority levels that are to be designated to another image group during the next SLIDE SHOW playback can be stored.

Figure 6:
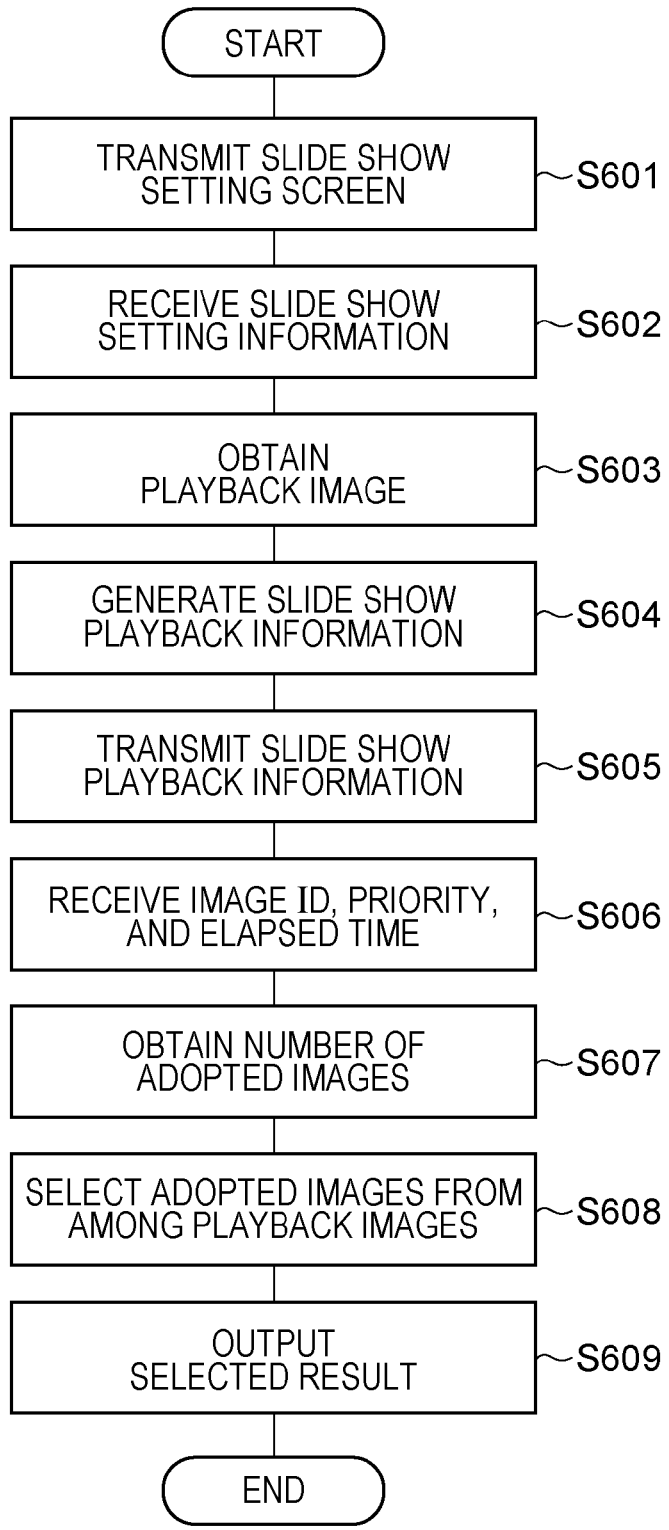
FIG. 6 is a flowchart illustrating an exemplary process performed by an application server according to an embodiment of the present invention.

The process implemented in the application server 102 will be described with reference to FIG. 6. Note that the process to be described below is implemented by controlling each of the units according to the OS and the SLIDE SHOW control application that have been read from the external storage device 238 by the control unit 231 in the application server 102.

First, the control unit 231 transmits the display control information of the SLIDE SHOW setting screen 400 to the client computer 101 in response to the request from the client computer 101 (S601). Then, the control unit 231 receives, from the client computer 101, the SLIDE SHOW setting information including the value input according to the SLIDE SHOW setting screen 400 (S602). The control unit 231 reads, from the external storage device 238, the image files included in the album set by the SLIDE SHOW setting information (S603). The control unit 231 generates the SLIDE SHOW playback information (S604). The SLIDE SHOW playback information includes control information for controlling the image files to be displayed in such a way that an image file is switched to the next image file when the one-image display period of the SLIDE SHOW setting information has elapsed, or for controlling the display in such a way as to place the image file, a command button, a title, and the like at predetermined positions. Then, the control unit 231 transmits the SLIDE SHOW playback information to the client computer 101 (S605). After that, the control unit 231 receives the image identifier, the priority level and the elapsed time that are linked with each other from the client computer 101 (S606) and stores them in the RAM 232.

Then, the control unit 231 obtains the number of the adopted images from the SLIDE SHOW setting information (S607) and selects the image identifiers by the number of the adopted images according to the priority level and the elapsed time that have been linked with the image identifiers (S608).

The control unit 231 outputs a result based on the selected image identifiers (S609). At that time, the control unit 231 can generate and output a list of the image identifiers, or can generate and output a list display screen of the thumbnail images of the image files linked with the image identifiers. Further, the control unit 231 can also generate and output a document file in which an image showing the image file linked with the image identifier is positioned at a template.

Figure 7:
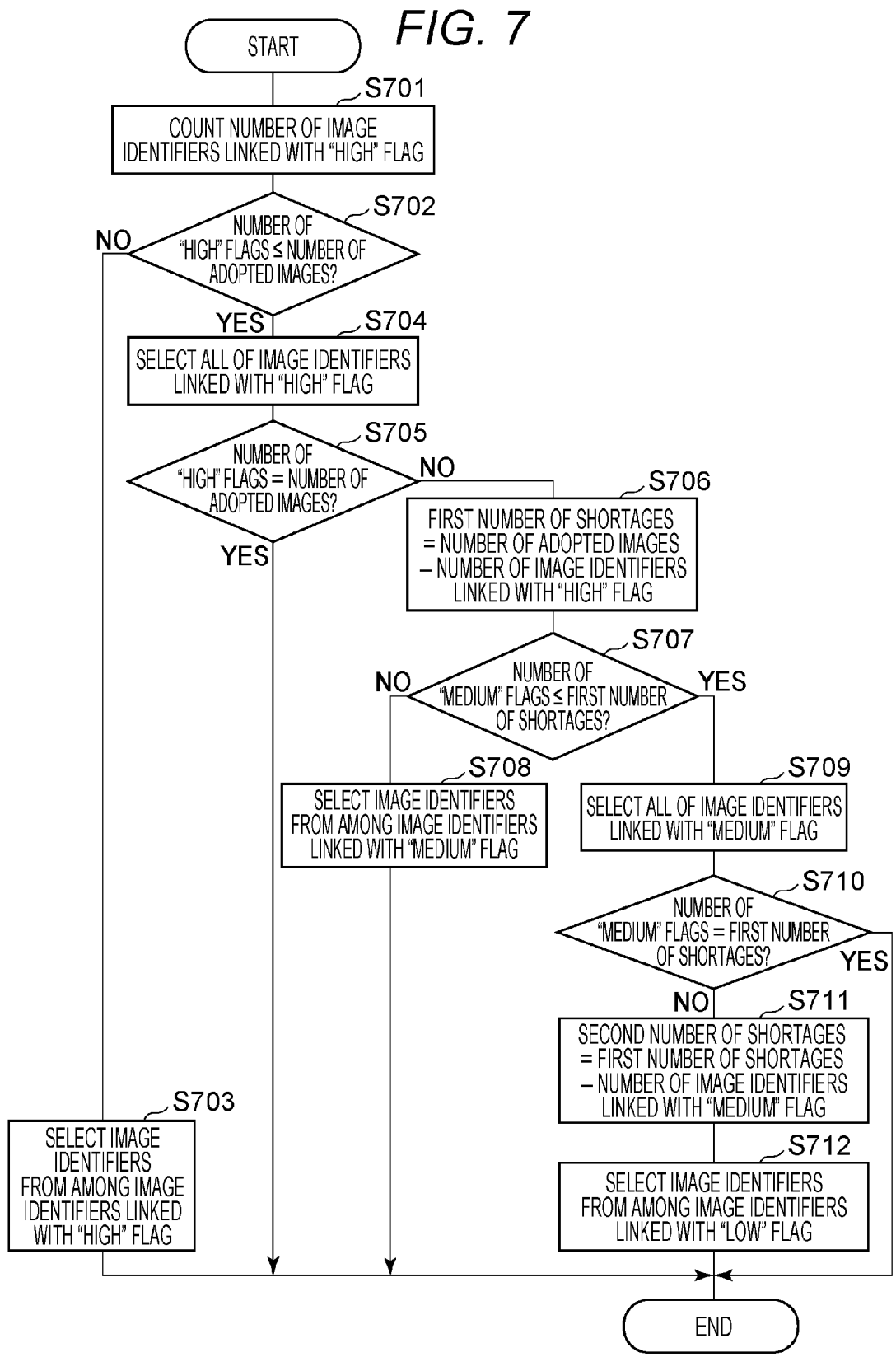
FIG. 7 is a flowchart illustrating an exemplary process performed by an application server according to an embodiment of the present invention.

The process for selecting the image identifiers in step S608 will concretely be described with reference to FIG. 7. First, the control unit 231 searches for an image identifier linked with the priority level "adopted", or namely, a "high" flag and counts the number of the image identifiers (S701). When determining that the number of the image identifiers linked with the "high" flag is larger than the number of the adopted images (No in S702), the control unit 231 selects the same number of image identifiers as the adopted images from among the image identifiers linked with the "high" flag (S703). In step S703, the control unit 231 sequentially selects image identifiers from among the image identifiers linked with the "high" flag in ascending order of the time elapsed until the flag has been set and by the number of the adopted images. This means that a short elapsed time shows that the user has given the flag without hesitation and the user has a strong intention to adopt the image corresponding to the image identifier.

On the other hand, when it is determined that the number of the image identifiers linked with the "high" flag is equal to or less than the number of the adopted images (Yes in S702), the control unit 231 selects all of the image identifiers linked with the "high" flag (S704). When the number of the image identifiers is equal to the number of the adopted images (Yes in S705), the process is terminated. When the number of the image identifiers linked with the "high" flag is less than the number of the adopted images (No in S705), the control unit 231 calculates a first number of shortages by subtracting the number of the image identifiers linked with the "high" flag from the number of the adopted images (S706). The control unit 231 counts the number of the image identifiers linked with the priority level "suspended", or namely, a "medium" flag and then compares the number of the image identifiers linked with the "medium" flag with the first number of shortages. When the number of the image identifiers linked with the "medium" flag is larger than the first number of shortages (No in S707), the control unit 231 selects the same number of image identifiers as the first number of shortages from among the image identifiers linked with the "medium" flag (S708). In step S708, the control unit 231 sequentially selects image identifiers from among the image identifiers linked with the "medium" flag in ascending order of the time elapsed until the flag has been set and by the first number of shortages. This means that a short elapsed time shows that the user has given the flag without hesitation on the assumption that an image identifier linked with the "medium" flag can also be selected. This means that it is no problem to adopt the image corresponding to the image identifier.

When it is determined that the number of the image identifiers linked with the "medium" flag is equal to or less than the first number of shortages (Yes in S707), the control unit 231 selects all of the image identifiers linked with the "medium" flag (S709). When the number of the image identifiers linked with the "medium" flag is equal to the first number of shortages (Yes in S710), the process is terminated. When the number of the image identifiers linked with the "medium" flag is less than the first number of shortages (No in S710), the control unit 231 calculates a second number of shortages by subtracting the number of the image identifiers linked with the "medium" flag from the first number of shortages (S711). The control unit 231 selects the same number of image identifiers as the second number of shortages from among the image identifiers linked with the priority level "rejected", or namely, a "low" flag (S712). In step S712, the control unit 231 sequentially selects image identifiers from among the image identifiers linked with the "low" flag in descending order of the time elapsed until the flag has been set and by the second number of shortages. This means that a short elapsed time shows that the user has given the flag without hesitation. This means that the user has a strong intention not to adopt the image corresponding to the image identifier.

Note that the user can set the selection order of image identifiers at one of the ascending and descending orders in advance in such a way as to select image identifiers according to the set order although, in step S708, image identifiers are selected from among the image identifiers linked with the "medium" flag in ascending order of the time elapsed until the flag has been set.

According to the present embodiment as described above, the content data are classified by the user operation or automatically while the image processing apparatus once plays back a SLIDE SHOW. This can save the user's effort and time.

Further, according to the present embodiment, when a predetermined number of content data is required, desired content data can be selected without a user's particular operation and according to the classification that has classified the content data or the time elapsed until a piece of content data has been classified.

Second Embodiment

A case in which the present invention is implemented in a client computer 101 without an application server 102 or a network 100 will be described in the present embodiment.

The client computer 101 of the present embodiment is implemented by an information processing apparatus, similarly to the first embodiment and includes a similar configuration as the configuration illustrated in FIG. 2. The client computer 101 of the present embodiment further stores a SLIDE SHOW playback application software program (hereinafter, referred to as a SLIDE SHOW playback application) in an external storage device 208. Concretely, the client computer 101 is implemented by devices such as a personal computer, a tablet terminal, a smartphone, or a digital camera.

Figure 8:
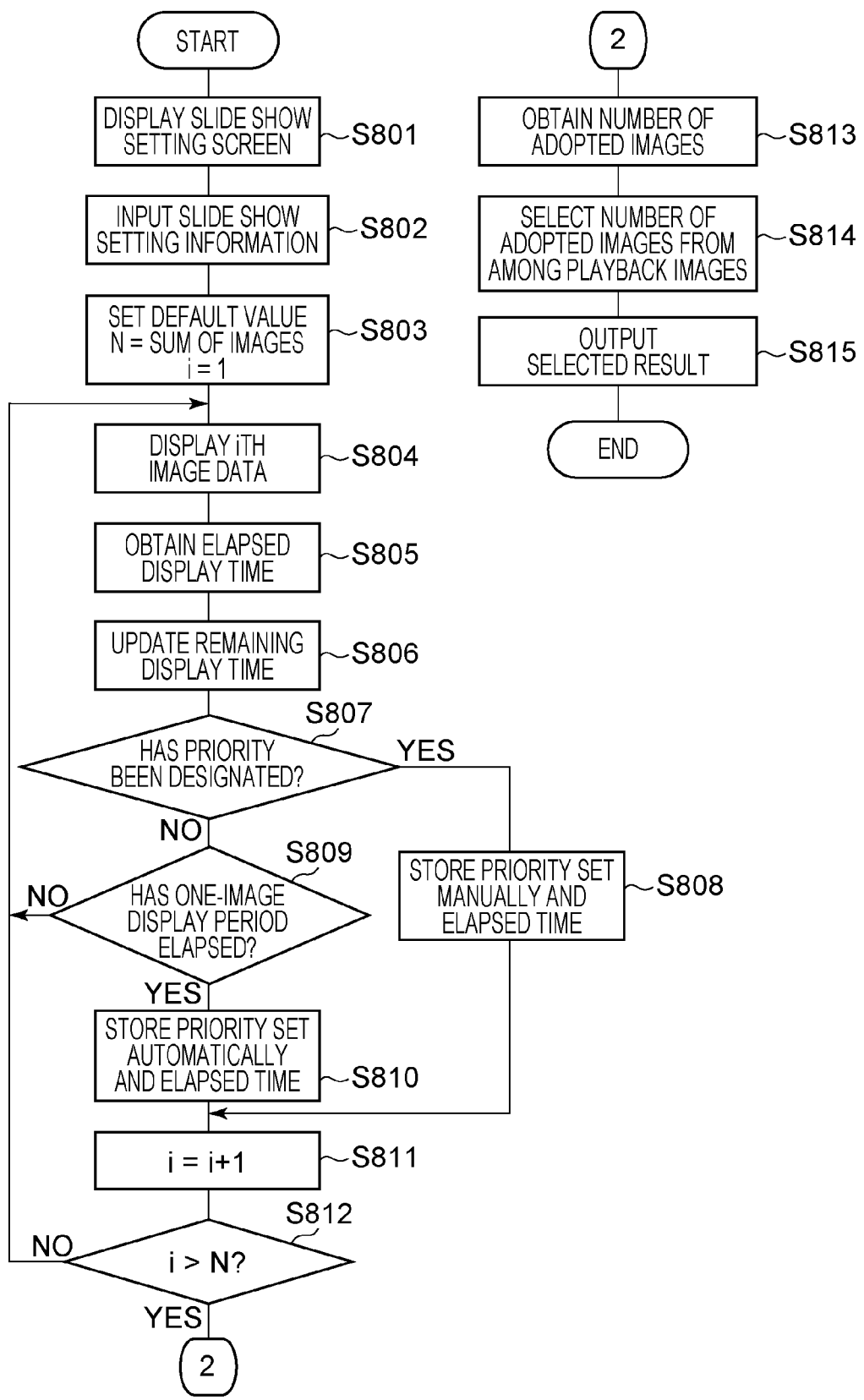
FIG. 8 is a flowchart illustrating an exemplary process performed by a client computer according to an embodiment of the present invention.

The process implemented in the client computer 101 will be described with reference to FIG. 8. Note that the process to be described below is implemented by controlling each of the units according to the OS and the SLIDE SHOW playback application that have been read from the external storage device 208 by a control unit 201 in the client computer 101.

First, the control unit 201 activates the SLIDE SHOW playback application in response to the user operation and display a SLIDE SHOW setting screen 400 on a display 209 (S801). The control unit 201 inputs the SLIDE SHOW setting information based on the SLIDE SHOW setting screen 400 and in response to the user operation. Upon detecting that a setting button 407 has been pressed down by the user operation, the control unit 201 stores the SLIDE SHOW setting information in a RAM 202 (S802).

Then, the control unit 201 substitutes the sum of the playback images into a variable "N" and substitutes "1" into a counter i as a default value (S803). The control unit 201 reads the ith image file from the external storage device 208 to display the image file on a SLIDE SHOW playback screen 500 (S804). The control unit 201 detects an elapsed time from the start of the display of the ith image file (S805), calculates the remaining display time from the difference between a one-image display period and the elapsed time to update and display the remaining display time on the SLIDE SHOW playback screen 500 (S806). The control unit 201 determines whether a priority level has been designated to the currently displayed image file by the user operation (S807). When a priority level has been designated (Yes in S807), the control unit 201 links the image identifier of the currently displayed ith image file with the designated priority level and the elapsed time from the start of the display of the ith image file until the priority level has been designated and stores them in the RAM 202 (S808).

On the other hand, when the priority level has not been designated (No in S807), the control unit 201 determines whether the elapsed time from the start of the display of the ith image file exceeds the one-image display period (S809). When the display time of the ith image file does not exceed the one-image display period (No in S809), the control unit 201 returns to step S804 to continue the display of the ith image file. Alternatively, when the display time of the ith image file exceeds the one-image display period (Yes in S809), the control unit 201 links the image identifier of the ith image file with the value that has been set at a priority level automatic setting field 405 and one-image display period and stores them in the RAM 202 (S810). At this time, the one-image display period is stored as the elapsed time from the start of the display of the ith image file until the priority level is designated.

The control unit 201 adds one to the counter i (S811). When the counter i is larger than the variable N (YES in S812), the control unit 201 obtains the number of the adopted images that has been stored in the RAM 202 (S813). Note that the control unit 201 returns to step S804 to display a new ith image file when the counter i is less than the variable N (No in S812).

Then the control unit 201 selects image identifiers by the number of the adopted images according to the priority level and the elapsed time that have been linked with the image identifiers (S814) and outputs a result based on the selected image identifiers (S815). In that case, the selecting method in step S814 is the same as that in step S608 and the outputting method in step S815 is the same as that in step S609. Further, when a piece of document data in which the image file has been inserted in a template is generated as the selected result, the control unit 201 can output the piece of document data to a printer 210 through a PRTC 206 and print it out. The case in which an image to be adopted is selected has been described in the first and second embodiments. However, the present invention can similarly be applied to the case in which an image to be deleted is contrarily selected. In that case, first, an image identifier linked with the priority level "rejected", or namely, a "low" flag is searched for and the number of the image identifiers is counted. When the number does not reach the number of the images to be deleted, an image identifier linked with the priority level "suspended", or namely, a "medium" flag is searched. As described above, an image linked with the priority level "rejected", or namely, the "low" flag is selected as the image to be deleted so that the selected image is deleted and hidden.

A case in which one of three types of flags "high", "medium", and "low" that indicate priorities "adopted", "suspended", and "rejected", respectively is given to an image file in order to classify the image file has been described in the first and second embodiments. However, the present invention is applied not only to that case but also to a case in which image files are classified into another type of categories, or to a case in which image files are classified into three types or more of categories as well. For example, the image files can be classified into five-stage rating levels or can be classified by giving a plurality of tags that has been set by the user arbitrarily. Note that rating levels or types of tags for automatic setting are also set in any case.

A case of displaying an image file has been described in the first and second embodiments. However, the present invention can be implemented not only in that case but also in a case of outputting another type of content data, for example, in an audio playback of a music file as well. In such a case, a plurality of music files is switched and played back each for a predetermined time to classify the currently played music file.

A case in which image files are switched every predetermined time during a SLIDE SHOW playback has been described in the first and second embodiments. However, the present invention can also be applied to a case in which image files are displayed without a time limit.

Other Embodiments

The present invention is also implemented by performing a process to be described below. In other words, the process is such that software (a program) for implementing the functions of the above-mentioned embodiments is supplied to a system or an apparatus through a network or various storage media so that a computer (or a CPU, an MPU, or the like) of the system or the apparatus reads and executes the program.

The functions of the above-mentioned embodiments are implemented not only by the execution of the program code read by the computer. The functions of the above-mentioned embodiments are obviously implemented, for example, by a process for which an OS (operation system) operating on the computer actually performs a part or the whole of the process based on the instructions of the program code. Further, the functions of the above-mentioned embodiments are obviously implemented by a process to be described below. First, a program code read from a storage medium is written into a memory included in a function expansion board inserted into the computer or in a function expansion unit connected to the computer. After that, a CPU or the like included in the function expansion board or in the function expansion unit actually performs a part or the whole of the process based on the instructions of the program code.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-123559, filed May 30, 2012, which is hereby incorporated by reference herein in its entirety.

What is claimed is:

1. An information processing apparatus, comprising:
a display unit configured to display a plurality of images on a screen one by one every predetermined time;
a manual classification unit configured to classify the image which is displayed on the screen as a first category or a second category in response to a user's operation while the image is displayed on the screen;
an automatic classification unit configured to classify the image as a third category if the image is not classified as the first category or second category by said manual classification unit, after the image is not displayed on the screen; and
a selection unit configured to select a predetermined number of images among the plurality of images classified by said manual classification unit or said automatic classification unit based on the classified category,
wherein said selection unit selects the image classified as the third category when the number of images classified as the first category is less than the predetermined number, and
wherein said selection unit selects the image classified as the second category when the number of images classified as the first category or as the third category is less than the predetermined number.

2. The apparatus according to claim 1, further comprising:
a measurement unit configured to measure an elapsed time between start of displaying of the image and detection of the user's operation,
wherein the selection unit selects the image based on not only the classified category but also the measured time.

3. The apparatus according to claim 1,
wherein said display unit switches the image being displayed on the screen in response to the user's operation before the predetermined time elapses.

4. The apparatus according to claim 1, further comprising:
an inserting unit configured to insert the selected image in a template including the predetermined number of frames.

5. The apparatus according to claim 1,
wherein the manual classification unit is capable of classifying the image as the third category in response to the user's operation while the content is displayed on the screen.

6. An information processing method, comprising:
displaying a plurality of images on a screen one by one every predetermined time;
classifying the image which is displayed on the screen as a first category or a second category in response to a user's operation while the image is displayed on the screen;
classifying the image as a third category if the image is not classified as the first category or second category, after the image is not displayed on the screen; and
selecting a predetermined number of images among the plurality of images classified based on the classified category,
wherein the selecting step selects the image classified as the third category when the number of images classified as the first category is less than the predetermined number, and
wherein the selecting step selects the image classified as the second category when the number of images classified as the first category or as the third category is less than the predetermined number.

7. A non-transitory computer-readable storage medium storing a program for causing a computer to perform an information processing method, the method comprising:
displaying a plurality of images on a screen one by one every predetermined time;
classifying the image which is displayed on the screen as a first category or a second category in response to a user's operation while the image is displayed on the screen;
classifying the image as a third category if the image is not classified as the first category or second category, after the image is not displayed on the screen; and
selecting a predetermined number of images among the plurality of images classified based on the classified category,
wherein the selecting step selects the image classified as the third category when the number of images classified as the first category is less than the predetermined number, and wherein the selecting step selects the image classified as the second category when the number of images classified as the first category or as the third category is less than the predetermined number.

* * * * *